(12) United States Patent
Nixon

(10) Patent No.: US 10,358,234 B2
(45) Date of Patent: *Jul. 23, 2019

(54) SYSTEMS AND METHODS OF CAPTURING LARGE AREA IMAGES IN DETAIL INCLUDING CASCADED CAMERAS AND/OR CALIBRATION FEATURES

(71) Applicant: nearmap australia pty ltd, Sydney NSW (AU)

(72) Inventor: Stuart William Nixon, Perth (AU)

(73) Assignee: nearmap Australia Pty Ltd, Sydney NSW (AU)

( * ) Notice: Subject to any disclaimer, the term of this patent is extended or adjusted under 35 U.S.C. 154(b) by 706 days.

This patent is subject to a terminal disclaimer.

(21) Appl. No.: 13/873,818

(22) Filed: Apr. 30, 2013

(65) Prior Publication Data

US 2015/0353205 A1    Dec. 10, 2015

Related U.S. Application Data

(63) Continuation of application No. 12/101,167, filed on Apr. 11, 2008.

(51) Int. Cl.
*H04N 7/18* (2006.01)
*G06K 9/00* (2006.01)
(Continued)

(52) U.S. Cl.
CPC .......... *B64D 47/08* (2013.01); *B64G 1/1021* (2013.01); *G01C 11/025* (2013.01);
(Continued)

(58) Field of Classification Search
CPC ....................................................... B64D 47/08
See application file for complete search history.

(56) References Cited

U.S. PATENT DOCUMENTS 1,654,070 A    12/1927    Corlette et al.
2,989,890 A    6/1961    Dressler
(Continued)

FOREIGN PATENT DOCUMENTS

EP    1 418 402 A1    5/2004
EP    1 418 402 B1    6/2006
(Continued)

OTHER PUBLICATIONS

Mike Hull, et al., "The SR-71 Sensor Pages, SR-71 Cameras (Optical); Payloads; Side Looking Radar and Defensive Systems", http://www.wvi.com/~sr71webmaster/sr_sensors_pg1.htm, Last Revised: Aug. 18, 2007, 19 pages.

(Continued)

*Primary Examiner* — Rebecca A Volentine
(74) *Attorney, Agent, or Firm* — Oblon, McClelland, Maier & Neustadt, L.L.P.

(57) ABSTRACT

Systems and methods are disclosed relating to acquisition of images regarding large area objects or large areas. In one exemplary embodiment, there is provided a method of obtaining or capturing, via a first system that includes one or more first image capturing devices, overview images, wherein the overview images depict first areas, as well as obtaining or capturing, via a second system that includes a plurality of image capturing devices, detail images characterized as being related to each other along an image axis. Moreover, the detail images may depict second areas that are subsets of the first areas, they may be arranged in strips parallel to the image axis, and they may have a higher resolution than corresponding portions of the first images.

14 Claims, 9 Drawing Sheets

(51) Int. Cl.
  *B64D 47/08* (2006.01)
  *G01C 11/02* (2006.01)
  *H04N 5/225* (2006.01)
  *H04N 5/232* (2006.01)
  *B64G 1/10* (2006.01)
  *H04N 5/341* (2011.01)

(52) U.S. Cl.
  CPC ....... *H04N 5/2258* (2013.01); *H04N 5/23238* (2013.01); *H04N 7/181* (2013.01); *B64G 2001/1028* (2013.01); *H04N 5/3415* (2013.01)

(56) References Cited

U.S. PATENT DOCUMENTS

| | | | |
|---|---|---|---|
| 4,662,588 A | 5/1987 | Henderson | |
| 4,671,650 A | 6/1987 | Hirzel et al. | |
| 4,689,748 A | 8/1987 | Hoffman | |
| 4,802,757 A | 2/1989 | Pleitner et al. | |
| 4,876,651 A | 10/1989 | Dawson et al. | |
| 4,951,136 A | 8/1990 | Drescher | |
| 5,073,819 A | 12/1991 | Gates et al. | |
| 5,104,217 A | 4/1992 | Pleitner et al. | |
| 5,138,444 A | 8/1992 | Hiramatsu | |
| 5,247,356 A | 9/1993 | Ciampa | |
| 5,251,037 A | 10/1993 | Busenberg | |
| 5,259,037 A | 11/1993 | Plunk | |
| 5,345,086 A | 9/1994 | Bertram | |
| 5,555,018 A | 9/1996 | Von Braun | |
| 5,581,637 A | 12/1996 | Cass | |
| 5,596,494 A | 1/1997 | Kuo | |
| 5,604,534 A | 2/1997 | Hedges | |
| 5,625,409 A | 4/1997 | Rosier | |
| 5,633,946 A | 5/1997 | Lachinski et al. | |
| 5,757,423 A | 5/1998 | Tanaka et al. | |
| 5,765,044 A | 6/1998 | Murai et al. | |
| 5,790,188 A | 8/1998 | Sun | |
| 5,798,923 A | 8/1998 | Laskowski | |
| 5,844,602 A | 12/1998 | Lareau | |
| 5,883,584 A | 3/1999 | Langemann et al. | |
| 5,894,323 A | 4/1999 | Kain | |
| 5,953,054 A | 9/1999 | Mercier | |
| 5,963,664 A | 10/1999 | Kumar et al. | |
| 5,991,444 A | 11/1999 | Burt | |
| 5,999,211 A | 12/1999 | Hedges | |
| 6,078,701 A | 6/2000 | Hsu | |
| 6,088,055 A | 7/2000 | Lareau | |
| 6,122,078 A | 9/2000 | Leberi et al. | |
| 6,134,297 A | 10/2000 | Chao | |
| 6,201,897 B1 | 3/2001 | Nixon | |
| 6,209,834 B1 | 4/2001 | Stonehouse | |
| 6,211,906 B1 | 4/2001 | Sun | |
| 6,255,981 B1 | 7/2001 | Samaniego | |
| 6,442,298 B1 | 8/2002 | Nixon | |
| 6,473,119 B1 | 10/2002 | Teuchert | |
| 6,490,364 B2 | 12/2002 | Hanna et al. | |
| 6,552,744 B2 | 4/2003 | Chen | |
| 6,587,601 B1 | 7/2003 | Hsu et al. | |
| 6,633,688 B1 | 10/2003 | Nixon | |
| 6,694,064 B1 | 2/2004 | Benkelman | |
| 6,757,445 B1 | 6/2004 | Knopp | |
| 6,834,163 B2 | 12/2004 | Trunz et al. | |
| 6,834,234 B2 | 12/2004 | Scherzinger et al. | |
| 6,928,194 B2 | 8/2005 | Mai | |
| 6,933,965 B2 | 8/2005 | Heafitz | |
| 6,996,254 B2 | 2/2006 | Zhang | |
| 7,009,638 B2 | 3/2006 | Gruber | |
| 7,019,777 B2 | 3/2006 | Sun | |
| 7,102,664 B2 | 9/2006 | Holdaway | |
| 7,127,348 B2 | 10/2006 | Smitherman | |
| 7,149,366 B1 | 12/2006 | Sun | |
| 7,212,938 B2 | 5/2007 | Mai | |
| 7,215,364 B2 | 5/2007 | Wachtel | |
| 7,233,691 B2 | 6/2007 | Setterholm | |
| 7,283,658 B2 | 10/2007 | Maruya | |
| 7,287,701 B2 | 10/2007 | Miller | |
| 7,307,655 B1 | 12/2007 | Okamoto et al. | |
| 7,310,606 B2 | 12/2007 | Nemethy et al. | |
| 7,339,614 B2 | 3/2008 | Gruber | |
| 7,424,133 B2 | 9/2008 | Schultz et al. | |
| 7,437,062 B2 | 10/2008 | Holcomb | |
| 7,509,241 B2 | 3/2009 | Guo et al. | |
| 7,630,579 B2 | 12/2009 | Mai et al. | |
| 7,639,897 B2 | 12/2009 | Gennetten et al. | |
| 7,668,402 B2 | 2/2010 | Grindstaff et al. | |
| 7,688,438 B2 | 3/2010 | Cutlip et al. | |
| 7,725,258 B2 | 5/2010 | Smitherman | |
| 7,873,238 B2 | 1/2011 | Schultz et al. | |
| 2001/0015755 A1 | 8/2001 | Mathews | |
| 2002/0063711 A1 | 5/2002 | Park et al. | |
| 2002/0085094 A1 | 7/2002 | Teuchert | |
| 2002/0149674 A1 | 10/2002 | Mathews | |
| 2002/0163582 A1 | 11/2002 | Gruber | |
| 2003/0048357 A1 | 3/2003 | Kain | |
| 2004/0041999 A1 | 3/2004 | Hogan et al. | |
| 2004/0100559 A1 | 5/2004 | Stacklies et al. | |
| 2004/0105090 A1 | 6/2004 | Schultz | |
| 2004/0212696 A1 | 10/2004 | Tsugita et al. | |
| 2004/0227821 A1 | 11/2004 | Matsuno | |
| 2004/0250288 A1 | 12/2004 | Palmerio | |
| 2004/0257441 A1 | 12/2004 | Pevear | |
| 2005/0018880 A1 | 1/2005 | Mostert et al. | |
| 2005/0031197 A1 | 2/2005 | Knopp | |
| 2005/0190991 A1 | 9/2005 | McCleese | |
| 2005/0261849 A1 | 11/2005 | Kochi et al. | |
| 2005/0265631 A1 | 12/2005 | Mai | |
| 2006/0028549 A1 | 2/2006 | Grindstaff et al. | |
| 2006/0077255 A1 | 4/2006 | Cheng | |
| 2006/0119622 A1 | 6/2006 | Kariathungal et al. | |
| 2006/0215038 A1 | 9/2006 | Gruber et al. | |
| 2006/0239537 A1 | 10/2006 | Shragai et al. | |
| 2006/0268131 A1 | 11/2006 | Cutler | |
| 2007/0003165 A1 | 1/2007 | Sibiryakov | |
| 2007/0046448 A1 | 3/2007 | Smitherman | |
| 2007/0104354 A1 | 5/2007 | Holcomb | |
| 2007/0139736 A1 | 6/2007 | Cutlip et al. | |
| 2007/0188610 A1 | 8/2007 | Micotto | |
| 2007/0263093 A1 | 11/2007 | Acree et al. | |
| 2007/0298869 A1 | 12/2007 | Boesen | |
| 2008/0063270 A1 | 3/2008 | McClelland et al. | |
| 2008/0063299 A1 | 3/2008 | Murai et al. | |
| 2008/0089577 A1 | 4/2008 | Wang | |
| 2008/0123994 A1 | 5/2008 | Schultz et al. | |
| 2008/0204570 A1 | 8/2008 | Schultz et al. | |
| 2008/0221843 A1 | 9/2008 | Shenkar et al. | |
| 2008/0231700 A1 | 9/2008 | Schultz et al. | |
| 2008/0273753 A1 | 11/2008 | Giuffrida et al. | |
| 2009/0041368 A1* | 2/2009 | Leberl et al. | 382/254 |
| 2009/0093959 A1 | 4/2009 | Scherzinger et al. | |
| 2009/0097744 A1 | 4/2009 | Shultz et al. | |
| 2009/0141020 A1 | 6/2009 | Freund et al. | |
| 2009/0256909 A1 | 10/2009 | Nixon | |
| 2010/0013927 A1 | 1/2010 | Nixon | |
| 2010/0277587 A1 | 11/2010 | Pechatnikov et al. | |
| 2011/0199931 A1 | 8/2011 | Anderson et al. | |

FOREIGN PATENT DOCUMENTS

| | | |
|---|---|---|
| EP | 1 696 204 A1 | 8/2006 |
| EP | 1 963 799 A1 | 9/2008 |
| JP | 62-284214 | 12/1987 |
| JP | 3-503311 | 7/1991 |
| JP | 8-211088 | 8/1996 |
| JP | 2002-202124 | 7/2002 |
| JP | 2003-524306 | 8/2003 |
| JP | 2006-507483 | 3/2006 |
| JP | 2008-39753 | 2/2008 |
| JP | 5642663 B2 | 12/2014 |
| WO | WO 97035166 | 9/1997 |
| WO | WO 99/33026 | 7/1999 |
| WO | WO 99/51027 | 10/1999 |
| WO | WO 03021187 A2 | 3/2003 |
| WO | WO 03021187 A3 | 3/2003 |
| WO | WO 2004/028134 A2 | 4/2004 |
| WO | WO 2005/100915 | 10/2005 |

(56) References Cited

FOREIGN PATENT DOCUMENTS

| WO | WO 2006/017219 | 2/2006 |
|---|---|---|
| WO | WO 2007/149322 | 12/2007 |
| WO | WO 2008/028040 A2 | 3/2008 |
| WO | WO 2008/101185 A1 | 8/2008 |

OTHER PUBLICATIONS

Kumar, R., et al.; Representation of Scenes from Collections of Images; 1995 IEEE; pp. 10-17.
Bunis, L.; ITT—Aerial Photography Field Office—National Agriculture Imagery Program (NAIP) Suggested Best Practices—Final Report; Feb. 1, 2007; pp. 1-34.
Bunis, L.; ITT—Aerial Photography Field Office—Scaled Variations Artifact Book; Feb. 1, 2007; 21 Pgs.
Snavely, N., et al.; Modeling the World from Internet Photo Collections; Accepted: Oct. 31, 2007; 22 Pgs.
U.S. Appl. No. 12/101,167, filed Apr. 11, 2008, 2009-0256909, Nixon.
U.S. Appl. No. 12/565,232, filed Sep. 23, 2009, 2010-0013927, Nixon.
U.S. Appl. No. 13/873,857, filed Apr. 30, 2013, Nixon.
Office Action dated Jun. 5, 2013, in Chinese Patent Application No. 200980112723.8 (with English-language Translation).
The Allen Consulting Group, "Economic and employment potential of NearMap aerial photomapping technology", Jul. 2009, 47 pgs., Australia.
Track'Air Aerial Survey Systems, MIDAS, Dec. 19, 2008, 10 pages, www.aerial-survey-base.com/cameras.html, Track'air B.V., The Netherlands.
Nixon, Stuart, "CRCSI Conference Presentation", Sep. 26, 2008.
Wolf, Peter R. and Dewitt, Bon A., "Elements of Photogammetry with Applications in GIS", 3rd ed. Boston: McGraw-Hill, 2000, pp. 383-390.
Triggs, Bill, et al., "Bundle Adjustment—A Modern Synthesis" Lecture Notes in Computer Science, vol. 1882, (Springer Verlag, Jan. 2000) 75 pgs.
Office Action dated Dec. 9, 2013 in Chinese Patent Application No. 200980112723.8 with English language translation.
Combined Office Action and Search Report dated Dec. 12, 2013 in Chinese Patent Application No. 201080042498.8 with English language translation.
Office Action dated Apr. 1, 2014 in Japanese Patent Application No. 2012-530353 (with English language translation).
Office Action dated Jun. 23, 2014, in Chinese Patent Application No. 200980112723.8 (with English-language Translation).
Office Action dated Jul. 21, 2014, in Chinese Patent Application No. 201080042498.8 (with English-language Translation).
"Elements of Photogrammetry with Applications in GIS" $3^{rd}$ Edition by Wolf and Dewitt, McGraw Hill, 2000, pp. 217-225 and pp. 342-344.
Office Action dated Oct. 2, 2014, in Russian Patent Application No. 2012116074 filed Sep. 22, 2010 (with English-language Translation).
Supplementary European Search Report dated Nov. 20, 2014, in European Patent Application No. 09729505.9.
Office Action dated Jun. 13, 2017 in Japanese Patent Application No. 2016-114465 (with English-language Translation).
Supplementary European Search Report dated Jul. 27, 2017 in European Patent Application No. 10818480.5.
Office Action dated Sep. 26, 2017 in Japanese Patent Application No. 2016-114465 (with English-language Translation).
U.S. Appl. No. 14/310,523, filed Jun. 20, 2014, Tarlinton et al.
U.S. Appl. No. 14/478,380, filed Sep. 5, 2014, Tarlinton et al.
U.S. Appl. No. 14/618,551, filed Feb. 10, 2015, Millin et al.
U.S. Appl. No. 14/687,544, filed Apr. 15, 2015, Lapstun et al.
Office Action dated Mar. 8, 2016 in Japanese Patent Application No. 2012-530353 (with English-language Translation).
Office Action dated Apr. 29, 2016 in Korean Patent Application No. 10-2012-7009283 (with English-language Translation).
Office Action dated Jul. 15, 2016 in Canadian Patent Application No. 2,773,303.
Office Action dated Sep. 21, 2015 in European Patent Application No. 09 729 505.9.
Office Action dated Mar. 17, 2015 in Japanese Patent Application No. 2012-530353 (with English translation).
Office Action dated Feb. 23, 2018 in Indian Patent Application No. 2253/DELNP/2012, 11 pages.
Afek, Y., et al. Mosaicking of Orthorectified Aerial Images; PE&RS, vol. 64, No. 2; Feb. 1998; pp. 115-125.
Kumar, R., et al.; Representation of Scenes from Collections of Images; 1995 IEEE; Pgs. 10-17.
DigitalGlobe—Basic Stereo Pair Imagery; Dec. 2009; 2 Pgs.
Zhu, Z. et al.; Stereo Mosaics from a Moving Video Camera for Environmental Monitoring; Article from First International Workshop on Digital and Computational Video; Dec. 10, 1999; 10 Pgs.
Zhu, Z., et al.; Mosaic-Based 3D Scene Representation and Rendering; 4 Pgs.
Grocholsky, B., et al.; Cooperative Air and Ground Surveillance—A Scalable Approach to the Detection and Localization of Targets by a Network of UAVs and UGVs; IEEE Robotices & Automation Magazine; Sep. 2006; pp. 16-26.
Eisenbeiss, H.; A Mini Unmanned Aerial Vehicle (UAV): System Overview and Image Acquisition; Nov. 18-20, 2004; 7 Pgs.
Optech—ILRIS-3D Operation Manual; Nov. 2006; 150 Pgs.
Gasparini, F., et al.; Color Balancing of Digital Photos Using Simple Image Statistics; pp. 1-39.
Bunis, L.; ITT—Aerial Photography Field Office—National Agriculture Imagery Program (NAIP) Suggested Best Practices—Final Report; Feb. 01, 2007; pp. 1-34.
Bunis, L.; ITT—Aerial Photography Field Office—Scaled Variations Artifact Book; Feb. 01, 2007; 21 Pgs.
Wu, X., et al.; A Colour-Balancing Method and its Applications; 8 Pgs.
Frueh C., et al.; Automated Texture Mapping of 3D City Models with Oblique Aerial Imagery; 8 Pgs.
Lin, C. et al.; 3-D Descriptions of Buildings from an Oblique View of Aerial Image; 1995 IEEE; pp. 377-382.
Hsieh Y.; SiteCity: A Semi Automated Site Modelling System; 1996 IEEE; pp. 499-506.
Neumann, K. J.; Operational Aspects of Digital Aerial Mapping Cameras; 4 Pgs.
Sandau, R., et al.; Design Priniciples of the LH Systems ADS40 Airborne Digital Sensor; IAPRS, vol. XXXIII, Amsterdam, 2000; 8 Pgs.
Hinz, A., et al.; Digital Modular Camera: System Concept and Data Processing Workflow; IAPRS, vol. XXXIII, Amsterdam, 2000; 8 Pgs.
Ratib, O.; PET/CT Image Navigation and Communication; The Journal of Nuclear Medicine, vol. 45, No. 1 (Suppl); Jan. 2004; pp. 46S-55S.
Snavely, N., et al.; Modeling the World from Internet Photo Collections; Rcvd: Jan. 30, 2007; Accepted: Oct. 31, 2007; 22 Pgs.
Abidi, M., et al.; Hybrid 3D Modeling of Large Lanscapes from Satellite Maps; Project in Lieu of Thesis for Master's Degree, The University of Tennessee, Knoxville, Fall 2003; pp. 1-61.
International Search Report dated Dec. 8, 2010 in International Application No. PCT/IB2010/002380.
Office Action dated Sep. 10, 2013, in Japanese Patent Application No. 2011-503521 (with English-language Translation).
Commercial Off-the-Shelf, Wikipedia, Wikimedia Foundation, Inc. (non-profit organization), search date: Aug. 29, 2013, Internet <URL: http://ja.wikipedia.org/w/index.php?title=%E5%95%86%E7%94%A8%E3%82%AA%E3%83%95%E3%82%B6%E3%82%B7%E3%82%A7%E3%83%AB%E3%83%95&oldiD=19066904.
Pierre J. Turon, et al. "LEO Thermal Imagers: Push Broom or Whisk Broom?", Proc. SPIE, Infrared Imaging Systems, Sep. 16, 1992, vol. 1689, pp. 396-405.
Paul F. Crickmore, "Lockheed Blackbird: Beyond the secret missions", Chapter 5: SR-71 technical briefing, 2004, pp. 135-139 with cover page.

(56) References Cited

OTHER PUBLICATIONS

Mike Hull, et al., "The SR-71 Sensor Pages, SR-71 Cameras (Optical); Payloads; Side Looking Radar and Defensive Systems", http://www.wvi.com/~srwebmaster/sr_sensors_pg1.htm, Last Revised: Aug. 18, 2007, 19 pages.

* cited by examiner

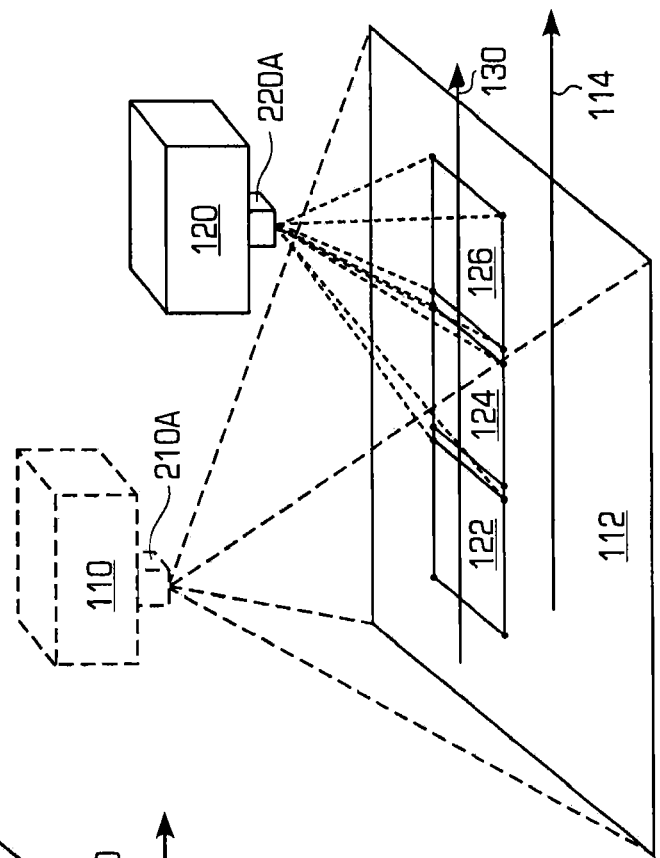
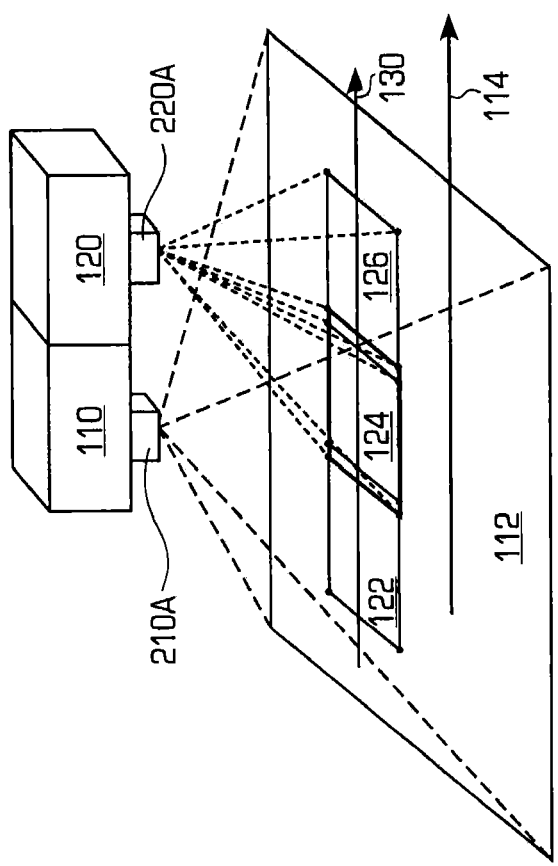

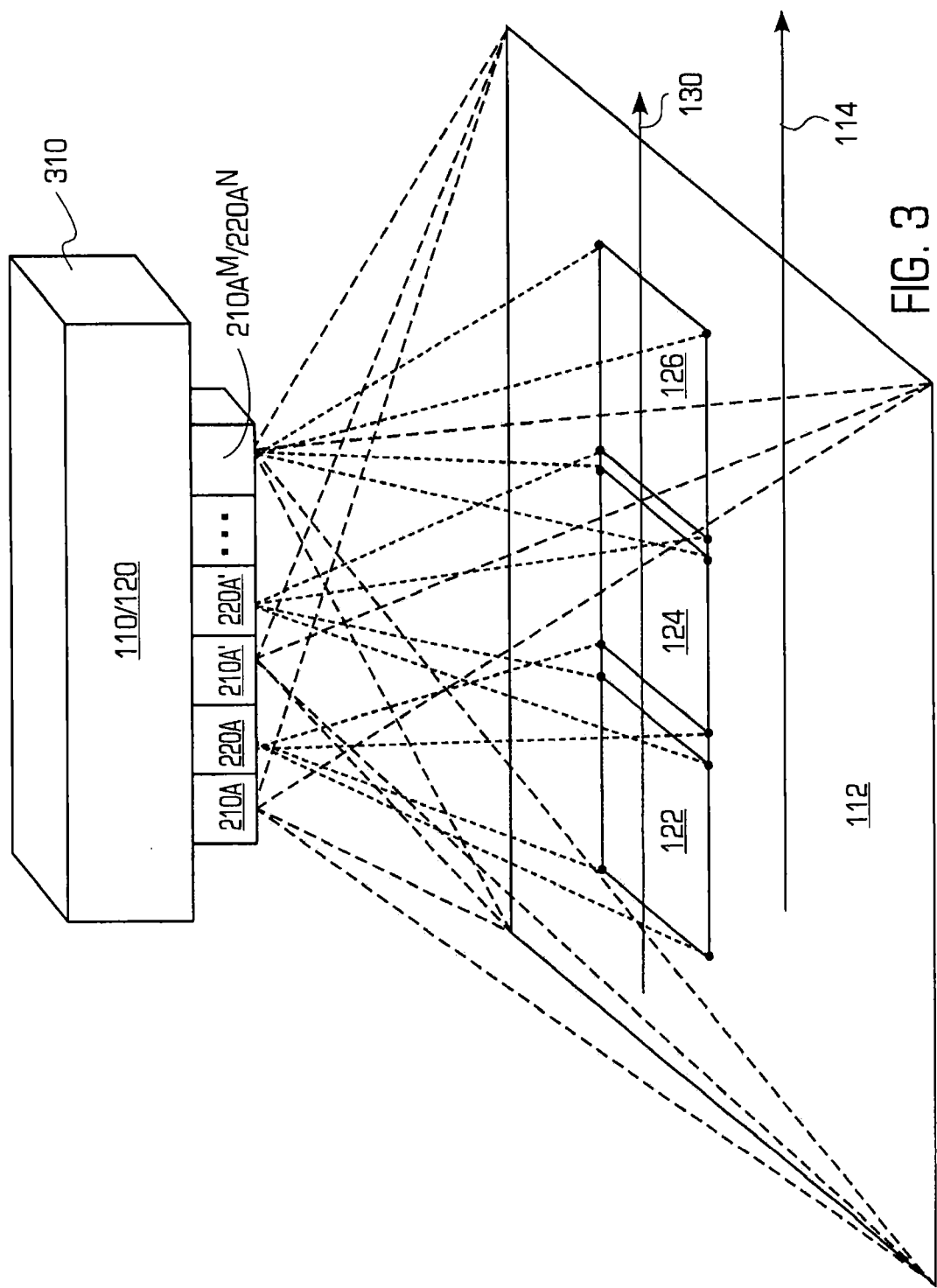

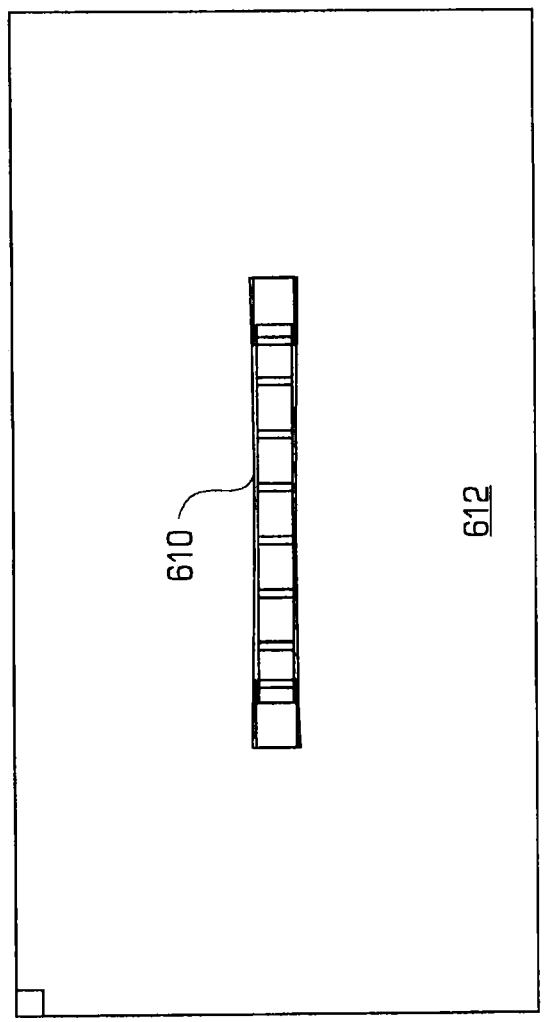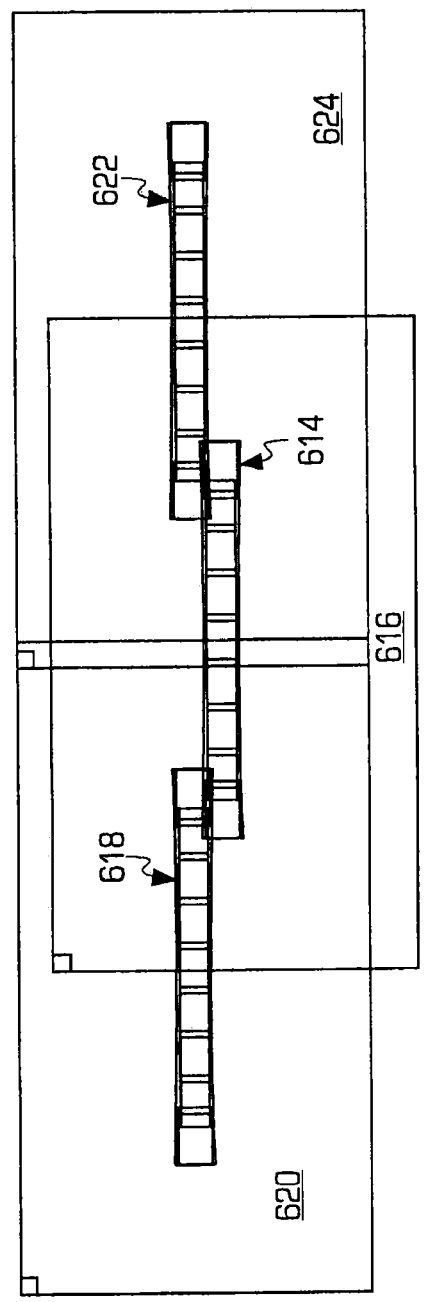

SYSTEMS AND METHODS OF CAPTURING LARGE AREA IMAGES IN DETAIL INCLUDING CASCADED CAMERAS AND/OR CALIBRATION FEATURES

CROSS-REFERENCE TO RELATED APPLICATIONS

This application is a continuation of U.S. application Ser. No. 12/101,167 filed Apr. 11, 2008, the entire content of which is incorporated herein by reference.

BACKGROUND

Field

The present invention relates to photogrammetry, and, more particularly, to systems and methods consistent with arrays of image capturing devices directed to the acquisition of images regarding large area objects or large areas.

Description of Related Information

Aerial and satellite imagery of the earth is used for a wide range of military, commercial and consumer applications. Recent innovations sometime include components that process and compress large amounts of images or serve entire photo imagery maps on the Internet, and advances such as these have further increased the demand for imagery. However, existing systems often involve overly complex components, require high capital expenditures, and/or have high operating costs, among other drawbacks. They are unable to yield imagery within narrower timeframes and operating regimes, or otherwise provide the higher resolution, presently desired.

In general, existing photogrammetry imagery solutions are failing to meet the increasing demand for more timely and higher resolution imagery. According to principles consistent with certain aspects related to the innovations herein, camera systems used for aerial photogrammetry must address two conflicting requirements.

First, it is vital that the camera system's lens and focal system parameters (known as Interior orientation), as well as its position in space and look angle (known as Exterior orientation) are precisely calculated. A photogrammetric solution known as bundle adjustment may be used to calculate Interior and Exterior orientation information for the camera and for each photo taken by the camera. Such calculations often represent a pre-requirement for enabling merging of individual photos into seamless photomaps. One way of achieving the required level of accuracy is to take multiple photos, with a large amount of redundant overlap between photos. Common features visible in multiple photos can then be identified and used to calculate camera interior and exterior parameters.

Second, it is desirable that aerial surveys be completed quickly. This provides several advantages like reduced operating costs and minimized delays stemming from unfavorable environmental or surveying conditions such as inclement weather. An effective way to increasing the amount of ground area captured, measured in $km^2$ per hour, is to minimize the amount of redundancy between photos.

As such, the need to increase redundancy between photos to enable accurate photogrammetric positioning of the photos must be balanced with the need to decrease redundancy between photos to complete surveys at a lower cost.

One existing approach uses "push-broom" linear detector arrays to minimize redundant capture and maximize capture rate. This approach minimizes the amount of redundancy and so increases capture rate. However, one drawback of this approach is that it sacrifices positional accuracy calculated from redundancy in the photos themselves, and so other complex methods must be used to accurately calculate camera system position information.

Another existing approach is to increase the size of the camera system being used, i.e., in terms of the megapixel count for the cameras or camera arrays. Here, for example, multiple sensors and/or lenses may be combined in a single unit to maximize the megapixel count for the camera system. While this approach may increase the megapixel size of the camera system, it fails to address reduction of redundancy between photos.

Various systems are directed to minimizing amounts of redundant overlap between photos in a survey. Some existing camera systems, for example, are mounted in a fully gyroscopically stabilized platform which in turn is mounted in an aircraft. These systems may insulate the camera(s) from excessive yaw, pitch and/or roll, and enable a lesser amount of redundancy to be used between photos. However, such stabilization systems are expensive and heavy, and suffer from drawbacks like higher camera system costs and the need for larger aircraft to fly the survey.

Other existing systems adapted to estimating camera pose and reducing redundant photo overlap requirements sometimes include one or more IMU (Inertial Measurement Unit) systems with the camera system to provide measurement of the camera's yaw, pitch and roll. Such IMU systems, however, are complex and expensive, and the ability to utilize units of sufficient accuracy is often constrained by export restrictions that prohibit their use in many countries.

Certain other existing systems may include D-GPS (Differential GPS) units that enable estimation of the camera systems position when each photo is taken. These units, with appropriate post-survey (i.e., post-flight) processing, allow position to be estimated to centimeter accuracy. However, D-GPS units are expensive, and typically require a direct signal path to the GPS satellites in order to measure the signal phase later used to calculate precise position. Thus drawbacks of these systems include the requirement that aircraft must take very gradual/flat turns at the end of each flight line in a survey, to ensure that portions of the aircraft such as a wing do not block the D-GPS antennae's view of the satellites. These gradual/flat turns add significantly to the amount of time required to fly a survey.

Still other existing systems provide improved photogrammetric solution accuracy via use of industrial grade high quality lenses, which can minimize the amount of Interior orientation error induced by lens distortions. However, such high quality lenses add significantly to the cost of the camera system.

Even with such techniques, aerial surveys still require a significant amount of overlap between photos in order to ensure production of high quality photomaps. The amount of overlap between photos varies depending on the application and desired quality. A common overlap is 30/80, meaning 30% side overlap with photos in adjacent parallel flight lines, and 80% forward overlap with photos along a flight line. This amount of overlap allows a feature to be identified on average in about 5 photos, which, in combination with the stability and position techniques discussed above, is sufficient to enable accurate photogrammetric bundle adjustment of photos.

However, side overlap of 30% and forward overlap of 80% means that only 14% of each photo covers new ground. About 86% of the photo information taken is redundant in terms of the final photomap product produces, so aerial surveys are fairly inefficient in terms of the amount of flying required to cover an area. Also, the redundant photo data must be stored and later processed, which further increases costs.

While greater levels of redundancy, or overlap, increase the ability to precisely calculate Exterior and Interior orientation for the camera system, such redundancy is largely wasted when creating a final photomap. This is because significantly more redundant imagery is captured than needed to create a photomap, which also increases the time and cost required to fly a survey. A satisfactory balance between these considerations is not available in a variety of other known systems, which all suffer from additional shortcomings.

For example, many existing systems for aerial photography require very expensive camera solutions that are typically purpose-built for the application. Such systems suffer the drawback that they cannot use COTS (Commercial Off the Shelf) cameras/hardware. Further, the heavy weight and high cost of these camera systems often requires the use of twin-engine turbo-prop aircraft, which further drives up operating costs since these aircraft are much more expensive to operate than common single engine commercial aircraft like the Cessna 210. Moreover, specific mounting requirements for such camera systems frequently require custom modification of the aircraft in order to mount the camera system.

Further, conventional large format aerial survey cameras are typically large, heavy and expensive. It is often impossible to configure systems of such cameras to take oblique photos at the same time as taking nadir photos. Oblique photography is very widely used in intelligence gathering and military applications, and has recently become popular for consumer applications. Oblique photomaps provide a view of objects such as houses from the side, where as nadir, or overhead, photomaps look from directly overhead and don't show the sides of objects. Oblique photography is also desirable to enable textures to be placed over 3D object models to increase realism. Existing systems that do provide oblique imagery often suffer additional limitations. For example, capture rates can be very low, and the aircraft typically must fly at low altitudes in order to capture high resolution oblique images. Moreover, minimal overlap is generally provided between photos from different obliques, making it difficult or impossible to create photogrammetrically accurate photomaps.

Furthermore, many existing systems have limited resolution (megapixels) per image and use much of their available resolution to capture redundant data used to accurately calculate camera position and pose. These systems suffer drawbacks when identification of smaller objects from the images is desired, such as the requirement that they fly surveys closer to the ground to capture images of high enough resolution to identify such objects. For example, a camera system must survey (fly) at 3,000 feet altitude to capture 7.5 cm pixel resolution photos using a Vexcel UltraCam-D camera. Flying at such a low altitude causes multiple problems. First, turbulence and thermals are much worse at these lower altitudes, which makes the flying rougher and more difficult for the pilot, and decreases the stability of the camera system. Secondly, flights over urban areas are more difficult at these altitudes, as ATC (Air Traffic Control) has to juggle the flight paths for the survey aircraft—which needs to fly a consistent set of flight lines— with incoming and outgoing flights from airports surrounding the urban area.

Interruptions in survey flights at these altitudes cause significant delays in capturing the survey, further increasing costs.

Many existing systems also require large amounts of data storage onboard the platform or aircraft. These systems typically include local image capturing systems and/or storage devices, to which image data is transmitted or downloaded from the cameras. Often, the storage must be both fast enough to store photo data streaming from the cameras, and capable of storing enough data to enable a reasonable amount of flying time. Further, many such systems use RAID based hard disk storage systems to store in-flight captured data. However, hard disks are sensitive to low air pressure at higher altitudes, which can result in head crashes or other data losses or errors.

In sum, there is a need for systems and methods that may adequately capture and/or process large area images in detail by, for example, utilization of one or more camera systems or arrays having image capturing/processing configurations that provide features such specified overlap characteristics, the ability to create detail photomaps, among others.

SUMMARY

Systems and methods consistent with the invention are directed to arrays of image capturing devices, and processes associated therewith, that acquire/process images of large area objects or large areas.

In one exemplary embodiment, there is provided a method of capturing, via a first system that includes one or more first image capturing devices, overview images, wherein the overview images depict first areas, and capturing, via a second system that includes a plurality of image capturing devices, detail images characterized as being related to each other along an image axis. In one or more further embodiments, the detail images depict second areas that are subsets of the first areas, are arranged in strips parallel to the image axis, and have a higher resolution than corresponding portions of the first images.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings:

FIGS. 2A-2B are block diagrams of exemplary systems consistent with certain aspects related to the innovations herein.

FIG. 3 is a block diagram of an exemplary system consistent with certain aspects related to the innovations herein.

FIGS. 6A-6B are diagrams illustrating exemplary overview and detail image representations consistent with certain aspects related to the innovations herein.

DETAILED DESCRIPTION OF SOME EXEMPLARY EMBODIMENTS

Reference will now be made in detail to the invention, examples of which are illustrated in the accompanying drawings. The implementations set forth in the following description do not represent all implementations consistent with the innovations claimed herein. Instead, they are merely some examples consistent with certain aspects related to the invention. Wherever possible, the same reference numbers will be used throughout the drawings to refer to the same or like parts.

Many systems and image capturing devices are used in terrestrial, airborne and space-borne platforms to acquire images of large area objects or large areas. These systems and platforms can be implemented with a variety of components, including cameras, processing components, data stores, telescopes, lenses or other devices having specialized components for capturing and/or processing images.

Figure 1:
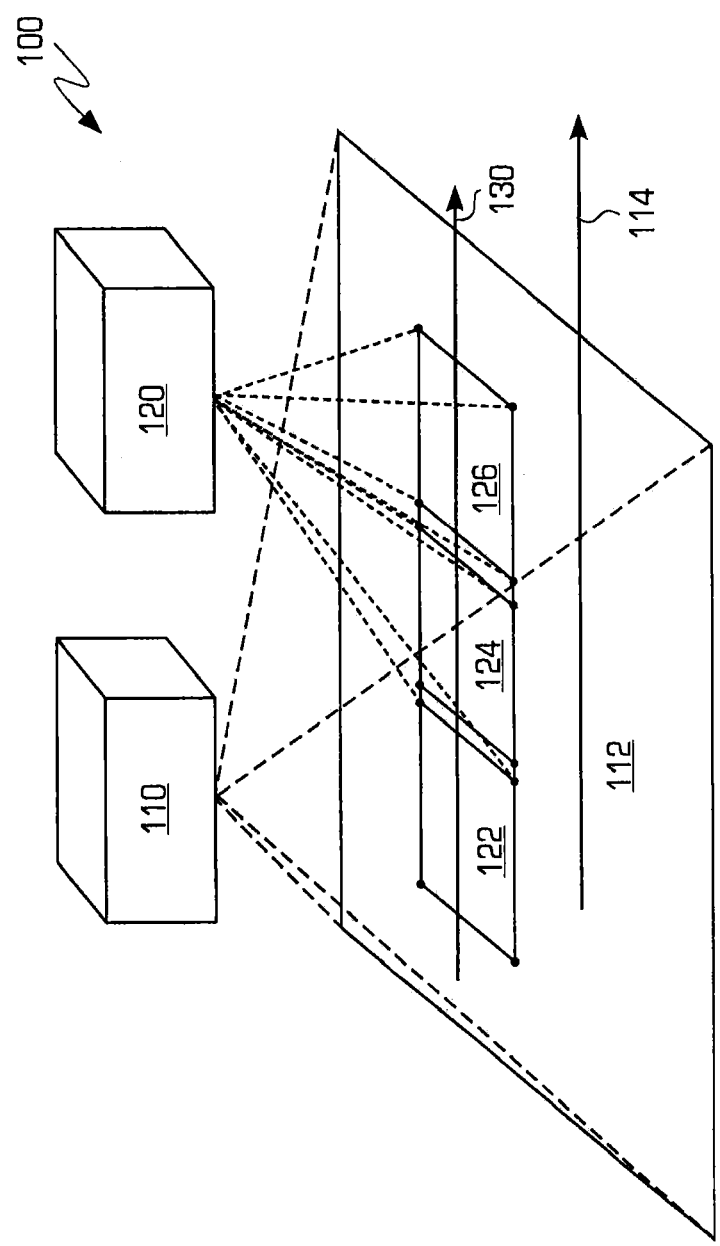
FIG. 1 is a block diagram of an exemplary system consistent with certain aspects related to the innovations herein.

FIG. 1 illustrates a block diagram of an exemplary system 100 consistent with certain aspects related to the present invention. Referring to FIG. 1, system 100 may comprise a first system 110 that acquires overview images 112, and a second system 120 that acquires detail images 122, 124, 126. According to some embodiments, the overview images may be characterized by a first or overview axis 114. Similarly, the detail images 122, 124, 126 may be arranged in strips along a second or detail axis 130. Further, the first and second systems 110, 120 may each include one or more image capturing devices, for example, cameras (throughout this disclosure, the broad term "image capturing device" is often referred to as "camera" for purpose of convenience, not limitation). As set forth in more detail below, innovations consistent with the arrangements herein provide systems and methods having numerous advantages, including the ability to accurately capture high resolution digital images over large areas for airborne or space-borne photomap surveys at a much faster rate and shorter survey flight time than existing systems.

Further, according to some aspects of the innovations herein, first and second systems 110, 120 may include arrays of digital image capturing devices, such as cascaded groups of multiple cameras mounted in rigid or semi-rigid mounts. Persons of ordinary skill in the art will appreciate that such mounting details are exemplary. For instance, rigid or semi-rigid mounting system can describe any apparatus capable of accurately defining relative position of the multiple and cascaded groups of cameras. Such a mounting system might be embodied via a variety of permutations, for example, it might comprise a physical rigid structure, such as mounting the cameras into a pod enclosure, it might comprise cameras keeping independent but accurate station relative to one another, such as cameras mounted in multiple distinct aerial or satellite systems with a local referencing system to define relative camera positioning between satellites, etc.

System 100 of FIG. 1 is also exemplary with regard to various configurations that may be present between or among systems 110, 120 and/or their image capturing devices. For example, FIGS. 2A-2B are block diagrams illustrating differing arrangements of the first system 110 and the second system 120 consistent with aspects related to the innovations herein. FIG. 2A shows an implementation wherein the first system 110 and the second system 120 are located in one fixed location, such as on an aerial platform, in a satellite, etc. FIG. 2B shows another implementation wherein the innovations reside in just one of system, specifically, here, in the second system 120. In this exemplary implementation, innovations consistent with acquisition/processing of particular images may occur primarily via the second system 120. Here, relationship information between the first system 110 and the second system 120, among arrays of cameras located therein, or among images obtained therefrom, is typically known or determinable, however, the innovations described herein are resident on or associated primarily with the second system 120. This arrangement may be useful, for example, when certain images, such as overview images, are obtained from a third party provider, while the remaining images are obtained via the second system 120. Lastly, while FIG. 2B illustrates the innovations residing in the second system 120, a similar arrangement may also exist with respect to the first system. As also depicted for purpose of illustration in FIGS. 2A-2B, the first system 110 may include one or more first image capturing devices or cameras 210A and the second system 120 may include one or more second image capturing devices or cameras 220A.

Such exemplary camera arrays may be configured such that one or more cameras capture photos with very high amounts of overlap, e.g., to help facilitate accurate calculation of camera system Interior and Exterior orientation. Further, a second cascaded sub-groups of cameras may be arranged to capture images with minimal overlap but high detail, e.g., to help facilitate processes such as refining the photogrammetric Interior and Exterior orientation, providing the photo image data needed to create detail photomap surveys, etc. Persons of ordinary skill in the art will appreciate that such delineations are exemplary, and configurations of cascaded cameras can be changed or tuned to specific applications. For example, cameras used to capture high-redundancy photos for calculating Exterior and Interior orientation can also be used to create lower-resolution overview photomaps for the survey. Further, cameras used for capturing low-redundancy high detail photos used to create detailed photomaps may also be used to refine Exterior and Interior estimates for the camera system.

In certain implementations, some cameras may be configured to maximize the amount of redundancy and overlap between photos, or otherwise enable more precise calculations of the Interior and Exterior orientations related to the camera systems. In further implementations, other cameras may be arranged to minimize the amount of redundancy and overlap between photos, or otherwise configured to enable creation of final detail photomap surveys with a minimum amount of wasted redundant photo imagery.

FIG. 3 is a block diagram of another exemplary system consistent with certain aspects related to the innovations herein. As shown in FIG. 3, a unitary platform or module 310 may include or embody both the first system 110 and the second system 120. According to further implementations, the platform 310 may also various arrangements and/or arrays of first and second image capturing devices or cameras 210A, 210A', 220A, 220A', etc. Such arrangements and arrays of cameras may be configured to provide the various types of images described herein. One exemplary implementation of such an arrangement is set forth in more detail in connection with FIG. 4, below. Advantages of implementations consistent with these arrangements include the ability to mount the systems in an external camera pod, enabling use of the camera systems in standard aircraft without custom modifications, as well as reduced weight and size for the camera system, enabling it to be used in a "small" aircraft (e.g., a single engine aircraft of lesser expense, such as a Cessna 210 or Diamond DA42 Twin Star), and also to enable it to be used in UAV (Unmanned Airborne Vehicle) aircraft.

Aspects of the innovations herein are also directed to overlap features existing between the cameras, the images, or both, as well as interrelationship of several such overlap features. In one implementation, with respect to overview images captured by the first system, exemplary cameras may be configured with wide-angle lenses and used to capture photos with a very large amount of overlap. Photos captured by these cameras cover a larger area per photo. This very high amount of overlap redundancy results in ground points being visible in many more photos than prior art camera systems, enabling precise positioning of Interior and Exterior orientation even without the use of a stabilised platform. For example, overlap of such overview images may be characterized in the range of 45-65/94-99 (45%-65% side overlap and 94%-99% forward overlap with regard to an axis), or narrower. Specifically, captured overview images may have side overlap redundancy of between about 45% to about 65% with images that are laterally adjacent the first axis, as well as forward overlap redundancy between about 94% to about 99% with images that are longitudinally adjacent the first axis. Narrower ranges include between about 50% to about 60% side overlap and between about 95% to about 99% forward overlap, between about 98% and about 99% forward overlap, about 50% side overlap and about 99% forward overlap, among others consistent with the parameters set forth herein. According to additional expressions of overlap consistent with the innovations herein, overview images may also be captured such that the images have overlap redundancy characterized in that a same imaged point is captured: in a quantity of overview images greater than about 30 and less than about 100, in an average of about 40 to about 60 images, in an average of about 50 images, or in a maximum of about 100 images, depending upon the systems and processes involved. A further expression of overlap may also include characterization in that a same imaged point is captured in a quantity of about 500 images, as explained in connection with FIG. 7A, below.

Further aspects of the innovations herein may also include arrays of one or more cameras configured with longer focal length lenses and are used to capture detail imagery to generate the detailed photomaps for the survey. Low amounts of overlap on these cameras may minimize redundancy and so maximize use of the photo imagery for the detail survey, and may provide other advantages such as significantly reducing the overall costs and time required to complete a survey. Here, for example, one measure of overlap of such detail images consistent with the innovations herein is characterized by a photo view overlap among the second image capturing devices is between about 0% and about 10%.

Figure 4:
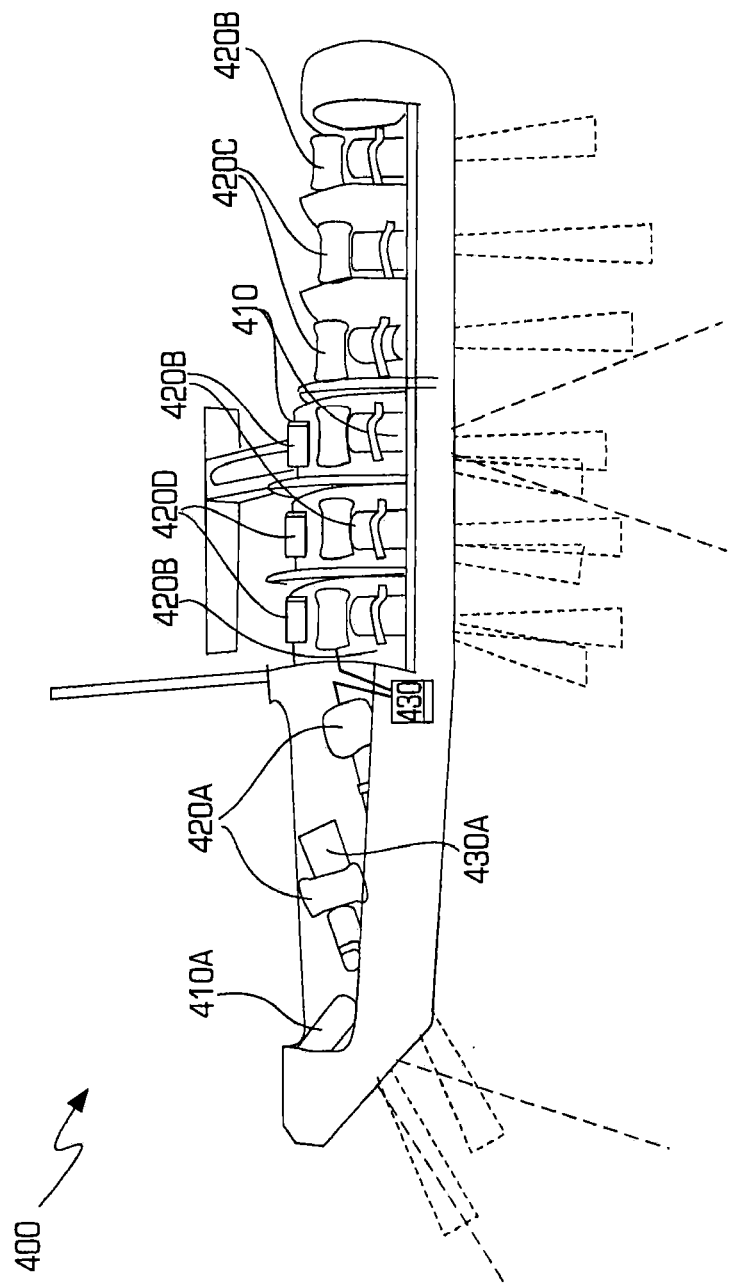
FIG. 4 is a diagram of an exemplary system including overview and detail image capturing devices consistent with certain aspects related to the innovations herein.

FIG. 4 is a diagram of an exemplary system including overview camera arrays and detail camera arrays consistent with certain aspects related to the innovations herein.

Referring to FIG. 4, a unitary module 400 is disclosed including a plurality of overview cameras 410, at least one data store 430/430A, a first array of detail cameras 420A, a second array of detail cameras 420B, a third array of detail cameras 420C, and a fourth array of detail cameras 420D, etc. These arrays of detail cameras may be used, for example, to obtain images of the various views set forth below at the same time while flying a single survey, such as multiple oblique views, overhead nadir views, etc. One of ordinary skill in the art would recognize that the quantities (i.e., of both the cameras and of the arrays) of detail cameras may be adjusted according to the specifications known to an ordinary artisan to provide for image results desired. Advantages consistent with such implementations include the ability to configure and/or reconfigure a module 400 to target different survey requirements, such as nadir photo maps, oblique photo maps, infrared photomaps, or any combination of these or other requirements that may arise. Further, innovations consistent with modules like that of FIG. 4 provide for improved initial estimates of the look angle for the Detail cameras relative to the Overview cameras.

Further, implementations consistent with FIG. 4 allow for the use of low-cost COTS (Commercial Off The Shelf) cameras, rather than requiring industrial quality and expensive camera systems as do many existing systems. According to some aspects of the innovations herein, systems and methods may include image capturing devices that are removably/modularly mounted in a platform such that individual image capturing devices are replaceable. For example, one or both of the first system or the second system may be configured/designed with removable mounting systems such that the image capturing devices may be interchanged with different image capturing devices. Exemplary image capturing devices, here, may include COTS cameras installed such that they may be individually removed for repair, replacement and/or upgrade. This provides particular innovations, such as the ability to quickly take advantage of new advances in digital photography, like rapid developments in and the low cost of next generation professional D-SLR (Digital Single Lens) cameras. Use of such cameras has advantages such as reducing the cost of the camera system in total, and also enables ready and rapid upgrade as new D-SLR cameras are released with increased resolution, higher performance, and/or lower cost.

As shown in FIG. 4, platforms or modules 400 consistent with the invention may also include a data store 430 or a plurality of such components, one associated with each camera 430A. With regard to the latter, some of the innovations herein include features of compressing and/or storing images in association with each camera, rather than requiring captured photos to be stored in a central storage system, transmitted, etc. Further, features directed to parallel compression and storage of photos on each camera increases the maximum throughput and storage for the camera system, which allows surveys to be flown at a faster rate, enabling more data to be stored and flight time to be increased.

Such parallel compression and storage on each camera also increases storage reliability, as it allows use of Compact Flash or other solid-state media on each camera. Existing systems typically store the raw linear sensor as 12 to 16 bit data stored to a central storage system. In contrast, by performing compression on each camera in parallel, innovations herein allow data to be converted to a gamma colour space such as YCbCr. This allows data to be stored as 8 bit data since increased bit depth is typically only needed for raw linear data, and further allows compression of images prior to storage on each camera's data store. Conversion to a gamma color space and compression can enable about a 10-fold reduction in storage space requirements. For example, in system having 14 cameras each with its own 32 GB Compact Flash memory card, the total of 448 GB of storage can be equivalent to upwards of about 4,500 GB or 4.5 TB of storage of raw uncompressed photo data. Further advantages relate to features of parallel operation and avoiding transmissions of image data or any other signals from the cameras to the flight control computer system, such as increasing capture rate for the camera system, reducing post-processing requirements, increasing robustness by reducing cabling and signalling requirements, among others.

Systems consistent with the exemplary implementations of FIGS. 1-4 may be utilized to implement image capturing methodologies consistent with certain aspects related to the innovations herein. These systems may include the image capturing devices from which the images described herein are obtained or captured, as well as other elements that process and store such images. According to some processes performed by these system, exemplary methods may include obtaining or capturing overview images, wherein the overview images depict first areas, as well as obtaining or capturing detail images characterized as being related to each other along an image axis. Here, the overview images may be obtained or captured via a first system or array including first image capturing devices. Further, the detail images may be obtained or captured via a second system or array including second image capturing devices. Moreover, the detail images captured may depict second areas that are subsets of the first areas, they may be arranged in strips parallel to the image axis, and/or they may have a higher resolution than corresponding portions of the first images.

With regard to the detail images, some of the image capturing processes herein are directed to capturing detail images at a resolution sufficient to produce a detail photomap. Regarding the capture of these detail images and/or the detail images themselves, determining sufficient resolution, here, is well known to those skilled in the art. Such determinations being consistent, for example, with those related to U.S. Pat. Nos. 6,078,701, 6,694,064, 6,928,194, 7,127,348, and 7,215,364, and/or U.S. patent application publication Nos. 2002/0163582A1, 200510265631A1, and 2007/0188610A1. Further, some aspects of the innovations herein are particularly well suited to creation of detail photomaps of much higher resolution than comparable systems, i.e., wherein the detail images are captured at a resolution sufficient to produce a detail photomap having a ground-pixel resolution of at least 10 cm. Innovations herein consistent with the above enable advantages such as one or more of enabling high-resolution surveys to be captured from higher altitudes, reducing impacts associated with Air Traffic Control restrictions, providing smoother flying conditions, and/or reducing pilot/operator workload.

With regard to the overview images, some of the image acquisition processes herein are directed to capturing images having overlap between images characterized in that a same image point is captured in a quantity of images sufficient to enable accurate bundle adjustment. Other image acquisition processes herein are directed to capturing images having overlap between images characterized in that a same feature is captured in a quantity of images as required by bundle adjustment. Further, the bundle adjustment solution may derived as a function of both the overview images and the detail images.

Bundle adjustment (see, e.g., Wolf, Elements of Photogrammetry, 1983, and Manual of Photogrammetry, 3rd Edition, American Society of Photogrammetry, 1966) is a known mathematical manipulation used to precisely calculate the position, known as exterior orientation, and camera calibration, known as interior orientation for each photo taken for a terrestrial, airborne or space-borne survey using camera systems.

The bundle adjustment referred to herein simultaneously refines estimates for ground point positions and for each photo's exterior and interior orientation. A ground point position is identified as a feature in each photo. A requirement for bundle adjustment is to maximize the average and maximum number of photos in which a ground point is identified. If a ground point is identified in too few photos, then the solution is not very rigid and suffers both from accuracy errors and from an increased risk of blunders, where incorrectly identified ground points have been used in the bundle solution. Bundle adjustment is also capable of refining photos that have different poses, for example images having different oblique angles or oriented differently.

According to the innovations herein, use of cascaded cameras allows the interior and exterior orientation of photos taken by the detail cameras be further refined through bundle adjustment. Using known bundle adjustment techniques, this may be achieved by identifying ground points visible in images captured by overview cameras and in images captured by detail cameras. As the overview cameras provide very high redundancy and thus accuracy in the bundle adjustment process, this serves as the basis for calculating accurate interior and exterior orientation for photos taken with detail cameras, despite the limited amount of redundancy and overlap provided by detail cameras. Advantages related hereto include the ability to enable self-calibration of camera interior orientation parameters, such as lenses focal length and distortions, allowing lower cost professional grade lenses to be used and affording automation of the photomap photogrammetry process.

Further aspects of the innovations herein allow for all or a plurality of cameras in the camera system(s) to have their shutters triggered at the same time or at nearly the same time. In this context, 'at nearly the same time' refers to a period of about 100 milliseconds given stable platform (i.e., flying, pitch, yaw, etc.) conditions. This provides further rigidity to the bundle adjustment solution, as the camera system can be modelled more accurately, for example, by using known bundle adjustment methods for multiple-camera interior and exterior orientation refinement.

Figure 5A:
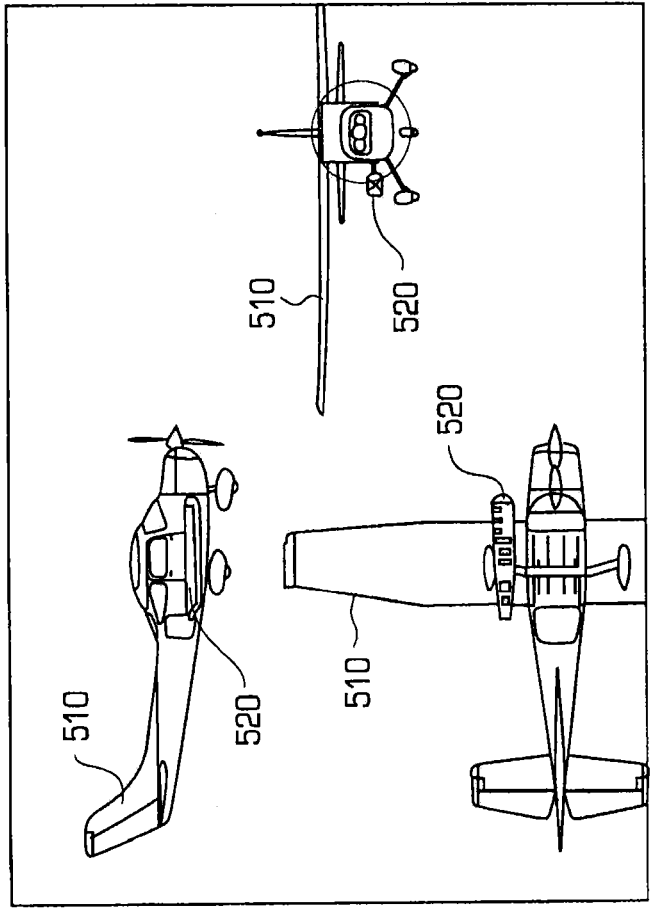
FIG. 5A illustrates one exemplary implementation including an external pod mounted on a small single engine aircraft consistent with certain aspects related to the innovations herein.
Figure 5B:
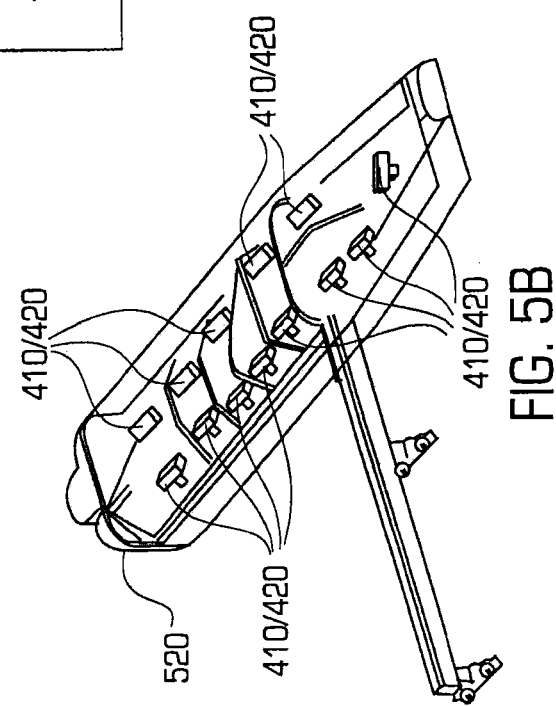
FIG. 5B illustrates one exemplary implementation of an image capturing system consistent with certain aspects related to the innovations herein.

FIG. 5A illustrates one exemplary implementation including an external pod mounted on a small single engine aircraft 510 consistent with certain aspects related to the innovations herein. Referring now to FIG. 5A, one specific embodiment of this invention is to mount the cameras for the camera system into a pod or removable enclosure 520, making it possible to use the camera system on a standard small aircraft 510 such as the Cessna 210 without requiring modifications to the airframe. FIG. 5B illustrates an exemplary implementation of an image capturing system consistent with certain aspects related to the innovations herein. As shown in FIG. 5B, a pod or removable enclosure 520 may include a plurality of overview/detail cameras 410/420, which may be grouped or arranged, e.g., in arrays, as set forth herein. Implementations such as these shown in FIGS. 5A and 5B provide high accuracy without requiring a stabilized mounting platform, and also enable sufficient weight and size reduction allowing the camera system to be mounted in a UAV.

FIGS. 6A-6B are diagrams illustrating exemplary overview and detail image representations consistent with certain aspects related to the innovations herein. FIG. 6A shows one exemplary representation wherein multiple cameras are configured to maximize the amount of detail image data 610 obtained in the unique area through the use of multiple detail cameras, while at the same time ensuring significant overlap exists between overview images 612 to enable accurate bundle adjustment.

The representation of FIG. 6A may be achieved, for example, using one overview camera (see, e.g., representative images 612, 616, 620, 624 thereof) to capture interior and exterior orientation, and a one cascade group of nine cameras organized to capture detailed strips 610, 614, 618, 622 or sub-portions of each overview photo in very high detail. As set forth above, aspects of the innovations herein may include rigid or semi-rigid alignment of cameras in the camera system, which allows photos to be taken with minimal overlap between photos within the strip. Further, images may be taken often enough to ensure overlap exists between consecutive photos along a flight line, and flight lines may be organized to ensure that there is overlap between strips of photos taken along adjacent flight lines. Unlike existing systems where significant overlap is required to perform accurate bundle adjustment, present innovations enable use of a minimal amount of overlap to exist between subsequent or adjacent photo strip details, which only needs to be sufficient to later perform creation of a seamless photomap. As a result, the redundancy required for a strip of photos from detail cameras is much less than with existing systems, which significantly decreases survey time and costs.

Figure 7A:
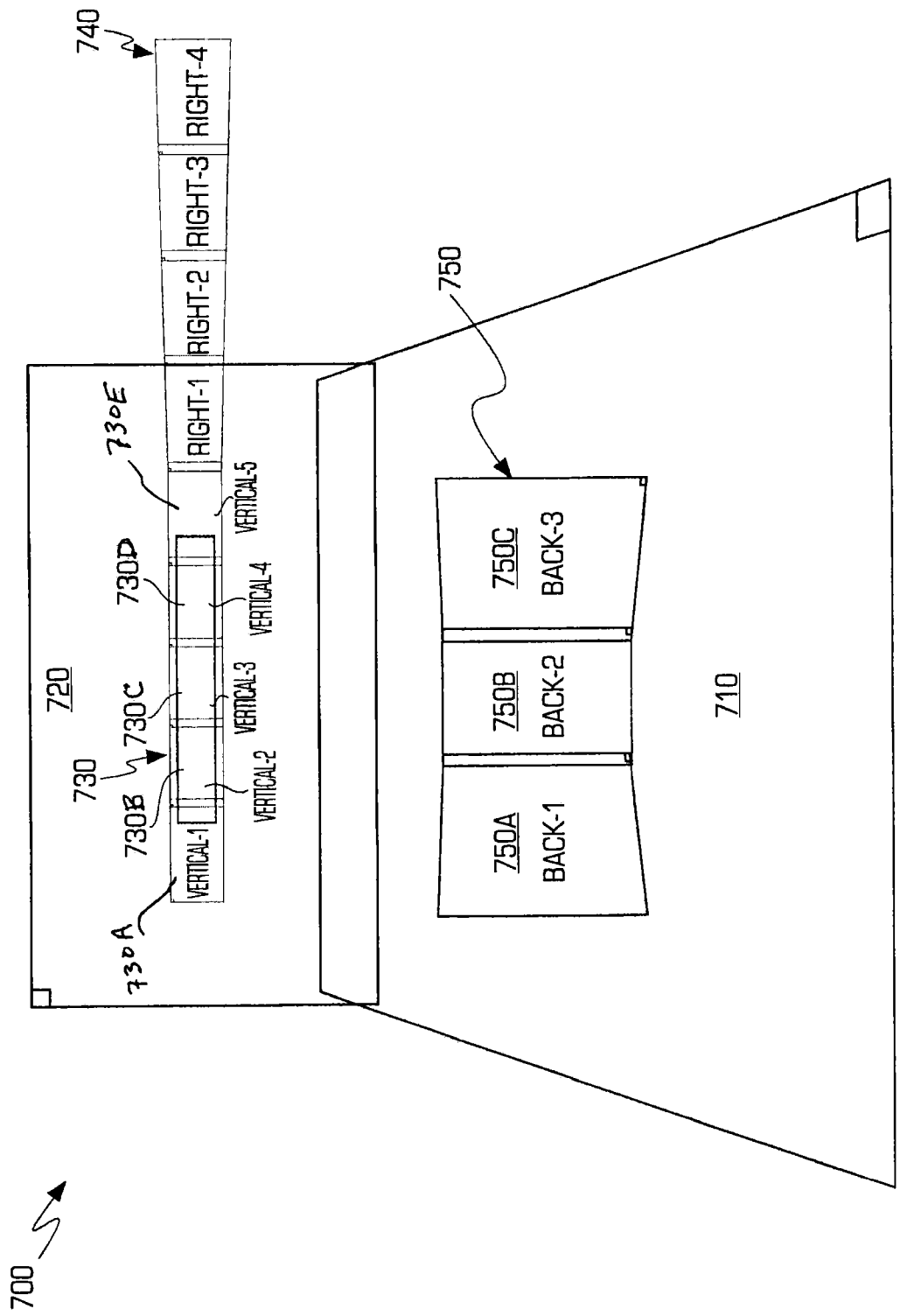
FIGS. 7A-7B are diagrams illustrating further exemplary overview and detail image representations consistent with certain aspects related to the innovations herein.
Figure 7B:
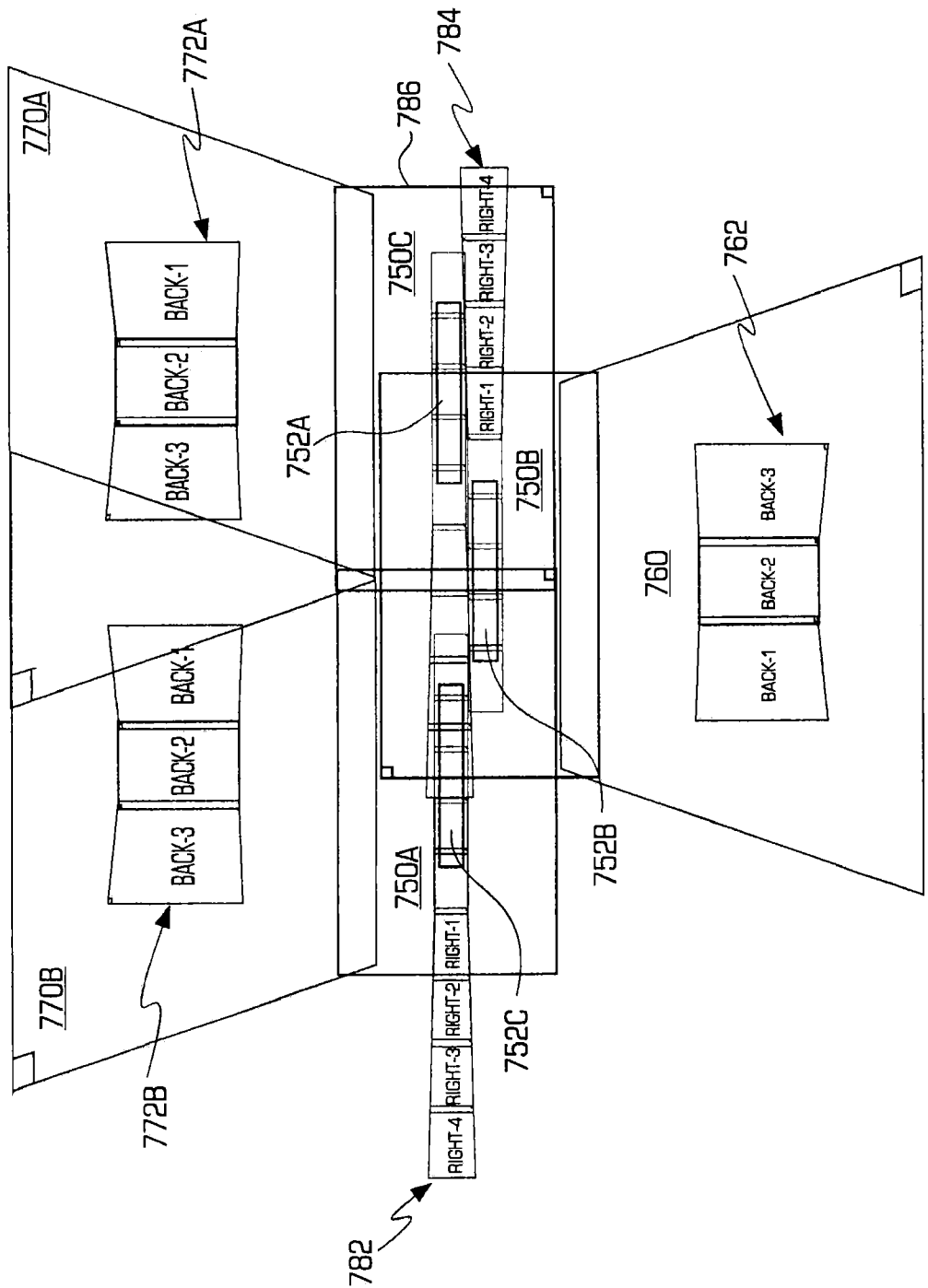

Moreover, as many additional detail cameras as required may be configured in a cascaded fashion to capture detailed sub-portions of the overview images for specific views, such as nadir overhead photomaps or oblique photomaps from different look angles. Because a single detail camera may not have sufficient resolution to capture a sub-portion in sufficient resolution for the desired survey, a group of detail cameras for a specific view perspective may be organized in a strip to capture a wider swath of the desired perspective. FIGS. 7A-7B are diagrams illustrating further exemplary overview and detail image representations consistent with certain aspects related to the innovations herein. FIG. 7A shows three cascaded groups of detail cameras where the five cameras (see, e.g., images 730, 730A-E) provide a detailed vertical view, four cameras (see, e.g., images 740) provide detailed left and right oblique views from alternating flight lines, and three cameras (see, e.g., images 750, 750A-C) provide detailed front and back oblique views from alternating flight lines. FIG. 7B illustrates a further embodiment, wherein multiple oblique views are provided by flying flight lines in alternating directions, for example, by obtaining four oblique views from two groups of oblique cameras.

The representation of FIG. 7A also illustrated another feature where multiple overview cameras 710, 720 are used, each oriented at a different pose. This exemplary feature increases the amount of overlap between photos considerably, allowing overlap between images that might be several flight lines away. As such, redundancy and rigidity of the feature matching solution may be significantly increased between images. Further, combining multiple overview cameras with different poses enables the same ground point to be visible and measured on 500 or more photos. This compares favorably with existing methods having 30%180% overlap, which result in a ground point being captured in an average of 5 photos.

Turning back to FIGS. 6B and 7B, these drawings illustrate the amount of overlap between images. Here, the overlap amounts to 50%/95% as these two implementations are compared to that FIG. 8B, which shows the 30/80 overlap as commonly used by prior art. Each of these figures show images or group of images in a sequence taken during a survey and adjacent images or groups of images in the previous and next flight line for the survey. The large amount of redundancy allows bundle adjustment to accurately refine photo interior and exterior position to sub-pixel accuracy for the overview cameras.

FIG. 7A illustrates other exemplary features of the invention, such as using two overview cameras 710, 720 to capture interior and exterior orientation, and three cascade groups of detail cameras 730, 740 and 750 to capture an overview nadir detail view and two oblique detail views. When the aircraft survey is flown in alternating directions for each flight line, then the two oblique views alternate direction, resulting in a total of four oblique detail views being captured in addition to the overview detail view. Indeed, the ability to configure the camera system to specific survey mission requirements enables the simultaneous capture of detail photomaps from different look angles, at the same time. FIG. 7A, for example, allows production of a detail overhead photomap and four detail oblique photomaps through a combination of multiple cascaded camera groups and the use of alternative flight lines.

Arranging strips of detail cameras into arrays or groups gives the camera system a high virtual megapixel count. With respect to an exemplary system consistent with FIG. 7A, e.g., one implementation uses 14 cameras, each being a 21 megapixel 35 mm D-SLR camera, yielding an effective camera system resolution of several gigapixels in size. In this exemplary implementation, one overview camera 710 provides a nadir overhead view connected to another overview camera 720 to provide a rear oblique overhead view. One cascade group of a plurality of detail cameras 730 may provide a detailed nadir survey imagery referenced within the first overview camera 710. Another cascade group of a plurality of detail cameras 750 may provide along track detailed oblique survey imagery referenced within the overview camera 720. Another cascaded group of a plurality of detail cameras 740 may provide across track detailed oblique survey images which are referenced using a rigid camera system body and/or referenced using overview camera imagery from adjacent survey flight lines as shown in FIG. 7B.

Figure 8A:
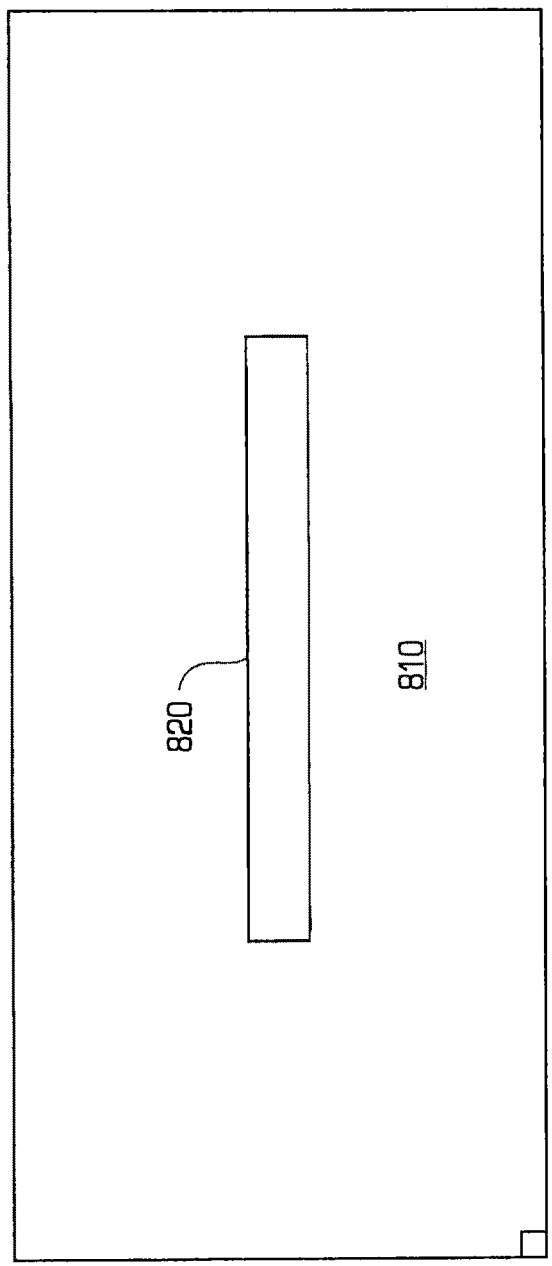
FIGS. 8A-8B are diagrams illustrating image representations having typical overlap conditions.
Figure 8B:
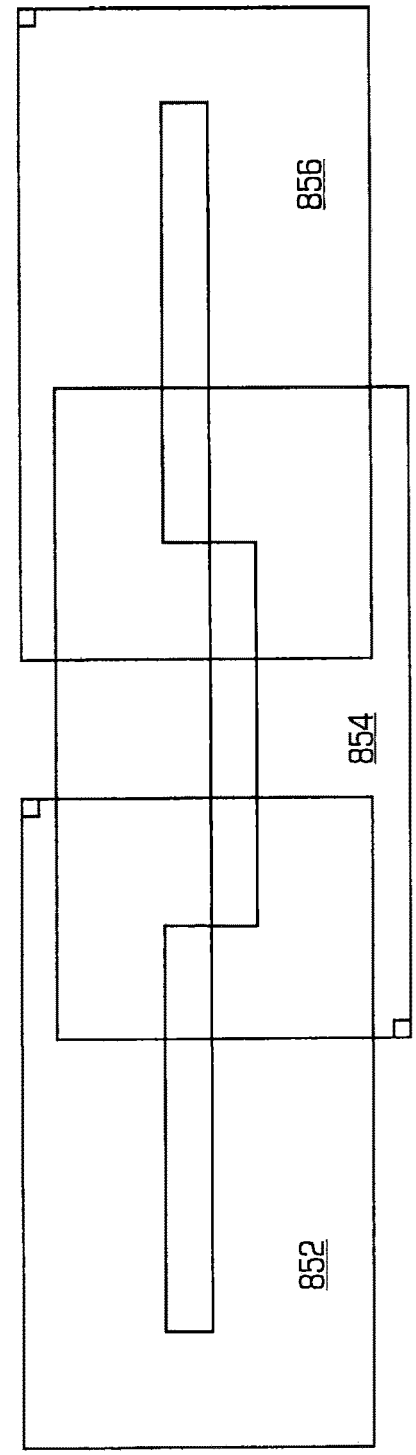

FIGS. 8A-8B are diagrams illustrating image representations showing typical overlap conditions of existing systems. FIGS. 8A-8B depicts representations of an existing large format camera configuration, where 810 is the total photo coverage of the ground for a single image and 820 represents the portion that is unique to this photo when a survey is flown with a typical 30%/80% overlap. It can be seen that the unique portion of the photo is only a small percentage of the total photo area, and thus the remaining photo area is redundant in terms of the final photomap requirement.

Features herein associated with minimizing overlap between photos captured by detail cameras have advantages such as maximizing use of imagery in resulting photomaps.

This allows surveys to be flown at higher altitudes and in less time. Flying surveys at higher altitude reduces impact on Air Traffic Control in busy urban areas, and generally provides for smoother flying conditions and lower pilot/operator work-load. Flying surveys in less time reduces the operating costs for the survey, and allows a survey to flown as soon as weather clears, rather than waiting for larger blocks of time with clear weather. Accordingly, innovations consistent with the above may also greatly increase the likelihood of capturing a survey despite inclement weather.

Further, aspects of the innovations herein that provides a high amount of overlap between photos captured by overview cameras enable "self-calibration", or accurate modelling of interior orientation lens and sensor characteristics using existing bundle adjustment self-calibration techniques. For example, as images are captured by the cascaded detail cameras are in turn mapped into the overview photos, such self-calibration modelling can be performed for detail cameras as well as for overview cameras. Because innovations herein enable accurate self-calibration, low-cost COTS professional grade lenses can be used in the camera system, instead of requiring the use of much more expensive industrial grade lenses.

Aspects of innovations herein also allow the use of IMU, D-GPS, stabilized platforms or other complex or expensive ancillary systems, which decreases the capital and operating cost for the camera system, and may reduce overall complexity. Still other advantages of the innovations herein allow for an increase the accuracy of calculated camera position and pose, without the need for expensive D-GPS, stabilisation or IMU ancillary sub-systems.

As may be appreciated in connection with the strip of detail images 610 in FIG. 6A, innovations herein also relate to the concept of the field of view for a group of detail cameras being very wide but very narrow. If the camera sensor platform pitches quickly enough in the direction of the narrow aspect of the field of view, it's possible that detail views of the ground might be missed. Although the risk of this happening is mitigated because the systems and methods herein may be practiced at higher (and, typically, much smoother) altitudes, the innovations may also include use of low-cost MEMS (Micro-Electro-Mechanical Systems) accelerometers to detect rapid changes in pitch. MEMS accelerometers are very cheap (they are used in air-bags), though are not suitable for many IMU measurements as they drift over time. However, implementations of MEMS with platform or aircraft acceleration, rapid pitch, etc and related image capturing devices afford particularized advantage to the presently described systems and methods. Innovations herein involve the use of MEMS accelerometers to measure rapid short-term pitch, yaw or or roll changes, and to use this information to increase the number of shutter events and photos taken during these times of rapid change to ensure that detail cameras with narrow fields of view still cover all the required ground area even during rapid changes of sensor platform pose.

Finally, Digital Elevation Models (DEMs) are a common by-product from the photogrammetric bundle adjustment process. DEMs are useful in their own right for applications such as flood and fire modelling, and are also required to produce ortho-rectified photomaps using the usual prior-art methods as present in applications such as ER Mapper [Nixon, Earth Resource Mapping, www.ermapper.com]. The overall accuracy of DEMs is commonly much more important than the density of measurements for the DEM itself. Ortho-rectification commonly uses DEMs that are 1/10th or less resolution than the photo imagery being rectified.

Aspects of the innovations herein provide a high level of overlap between images captured by overview cameras. A single ground point can typically be observed in several orders of magnitude more photos than possible in existing camera systems. As such, the redundancy of observations of ground points provided by innovations herein also enables production of robust and accurate DEMs.

It is to be understood that the foregoing description is intended to illustrate and not to limit the scope of the invention, which is defined by the scope of the appended claims. Other embodiments are within the scope of the following claims.

The invention claimed is:

1. A method of creating a photomap of a survey area, the method comprising:
    (a) flying an aircraft above the survey area along a set of substantially parallel flight lines;
    (b) capturing, during flight and via at least one overview camera carried by the aircraft, a sequence of overview images, each overview image depicting an overview area of the survey area, consecutive overview areas along each flight line overlapping longitudinally by a first overlap proportion, adjacent overview areas associated with adjacent flight lines overlapping laterally;
    (c) capturing, during flight and via a first array of detail cameras carried by the aircraft, a sequence of detail image strips, each detail image strip comprising at least one detail image, each detail image depicting at least a portion of an overview area, each detail image having a higher resolution than a resolution of the overview image corresponding to the overview area, consecutive detail image strips along each flight line overlapping longitudinally by a second overlap proportion, the second overlap proportion being smaller than the first overlap proportion, adjacent detail image strips associated with adjacent flight lines overlapping laterally, adjacent detail images within each strip overlapping laterally;
    (d) identifying, in a plurality of the overview images and detail images, common features corresponding to common ground points;
    (e) generating, via bundle adjustment and from the identified ground points, an exterior orientation associated with each detail image; and
    (f) merging, based on at least some of the generated exterior orientations, at least some of the detail images to create the photomap.

2. The method of claim 1, wherein the first array of detail cameras provides a vertical view, and the photomap provides a vertical view.

3. The method of claim 2 further comprising capturing, via a second array of detail cameras, a sequence of oblique detail image strips, and creating, from the oblique detail image strips, an oblique photomap of the survey area.

4. The method of claim 1, wherein the aircraft is selected from the group comprising a single-engine manned aircraft and an unmanned aerial vehicle (UAV).

5. A system for creating a photomap of a survey area, the system comprising:
    (a) an aircraft;
    (b) at least one overview camera carried by the aircraft;
    (c) a first array of detail cameras carried by the aircraft; and
    (d) a computer system, wherein
    the aircraft is operable to be flown above the survey area along a set of substantially parallel flight lines;

the at least one overview camera is configured to capture, during flight, a sequence of overview images, each overview image depicting an overview area of the survey area, consecutive overview areas along each flight line overlapping longitudinally by a first overlap proportion, adjacent overview areas associated with adjacent flight lines overlapping laterally;

the first array of detail cameras is configured to capture, during flight, a sequence of detail image strips, each detail image strip comprising at least one detail image, each detail image depicting at least a portion of an overview area, each detail image having a higher resolution than a resolution of the overview image corresponding to the overview area, consecutive detail image strips along each flight line overlapping longitudinally by a second overlap proportion, the second overlap proportion being smaller than the first overlap proportion, adjacent detail image area strips associated with adjacent flight lines overlapping laterally, adjacent detail image second areas within each strip overlapping laterally, and the computer system is configured to:

(i) identify, in a plurality of the overview images and detail images, common features corresponding to common ground points, (ii) generate, via bundle adjustment and from the identified ground points, an exterior orientation associated with each detail image; and (iii) merge, based on at least some of the generated exterior orientations, at least some of the detail images to create the photomap.

6. The system of claim 5, wherein the first array of detail cameras provides a vertical view, and the photomap provides a vertical view.

7. The system of claim 6, further comprising a second array of detail cameras configured to capture a sequence of oblique detail image strips, wherein the computer system is further configured to create, from the oblique detail image strips, an oblique photomap of the survey area.

8. The system of claim 5, further comprising an enclosure within which the cameras are mounted.

9. The system of claim 8, wherein each camera is removably mounted within the enclosure.

10. The system of claim 8, wherein the enclosure is adapted to be mounted to the exterior of the aircraft.

11. The system of claim 8, wherein the enclosure is adapted to be removably mounted to the exterior of the aircraft.

12. The system of claim 5, further comprising a plurality of data storage devices, each data storage device associated with a respective one of the cameras and configured to store images captured by the camera.

13. The system of claim 12, wherein each data storage device is a flash memory storage device.

14. The system of claim 5, wherein the aircraft is selected from the group comprising a single-engine manned aircraft and an unmanned aerial vehicle (UAV).

* * * * *